United States Patent [19]

Johansson

[11] 4,269,620

[45] May 26, 1981

[54] PROCESS FOR THE PREPARATION OF SILICON OR FERROSILICON

[75] Inventor: Thomas Johansson, Ljungaverk, Sweden

[73] Assignee: Kemanord AB, Stockholm, Sweden

[21] Appl. No.: 41,910

[22] Filed: May 24, 1979

[30] Foreign Application Priority Data

Jun. 2, 1978 [SE] Sweden ............................. 7806524

[51] Int. Cl.³ ............................................. C21C 5/52
[52] U.S. Cl. ...................................... 75/11; 423/350; 75/134 S
[58] Field of Search ................. 423/350; 75/11, 134 S

[56] References Cited

U.S. PATENT DOCUMENTS

| | | | |
|---|---|---|---|
| 3,660,298 | 5/1972 | McClincy et al. | 423/350 |
| 3,887,359 | 6/1975 | Enger et al. | 75/11 |

*Primary Examiner*—M. J. Andrews
*Attorney, Agent, or Firm*—Fred Philpitt

[57] ABSTRACT

A process for the production of silicon or ferrosilicon by reduction of silicon oxide, optionally in the presence of iron oxide, by means of a carbonaceous reducing agent in a reduction furnace. The furnace operation is simplified and the yield is increased by making the supply of energy and the supply of silicon oxide, respectively, independent of each other and by adjusting the ratio between them in such a manner that the gases leaving the furnace have a silicon monoxide content below 10 mole percent. A controlled supply of at least a part of the silicon oxide to the hotter parts of the furnace can be used as a means of making the supply of energy and the supply of silicon oxide reciprocally adjustable.

8 Claims, 4 Drawing Figures

FIG.3

PROCESS FOR THE PREPARATION OF SILICON OR FERROSILICON

This invention relates to a process for the production of silicon or ferrosilicon by reduction of silicon oxide with carbonaceous reducing agents in a reduction furnace.

The at present time predominant production method for elementary silicon or ferrosilicon, consists in charging carbon and quartz optionally with addition of iron or iron oxide into an open electric arc furnace. The materials are heated to a high temperature at the bottom of the furnace by means of electric arcs from electrodes whereby the oxides are reduced by the carbon and form a melt of silicon or ferrosilicon which can be discharged from the furnace. This method is, however, for many reasons inefficient and problematic. During the furnace process bridges or semi-molten material are formed in the charge as well as blow holes through which gas losses occur. The charge must therefore be stirred and worked regularly, and this must because of the heat be done intermittently and by use of devices outside the furnace. As a consequence of this the furnace cannot be closed, which results in heat and gas losses and thus small possibilities of closing the process with respect to energy and efficiently limiting environmental problems. Moreover, the furnace process is difficult to control and formation of silicon carbide in the furnace and waste of unreacted silicon monoxide cannot be completely prevented and this results in a utilization of raw materials and energy of at most 80 to 90 percent. The purity of the product is not particularly good and, moreover, varying and very dependent on the raw materials used.

The attempts to overcome these problems which have been made so far have not been successful. Changes of process variables, such as charging rates, power supply or the ratio of charged carbon to quartz, have only been able to influence furnace process and yield marginally.

The Swedish Pat. Nos. 220 338 and 363 084 disclose especially adapted charging material prepared in order to attempt to influence the furnace process in this way. The methods have given a certain improvement of the furnace process but have only been able to influence the yield marginally.

It is further known from the Swedish Pat. No. 382 042 to charge carbon and quartz separately to the furnace and to keep these materials separated in different parts of the furnace. In this way the need of stirring in the furnace can be reduced, but also in this case the efficiency of the process and the problems associated with it can only be influenced to a small extent.

Owing to the difficulties in improving the conventional process substantially, attempts have been made to find new ways of preparing silicon. These comprise trials with new reducing agents such as hydrogen and metals or processes via the halogen compounds of the silicon, but these methods have not yet led to a commercial realization, and with respect to the great capital invested in plants for production of silicon in a conventional manner there is a need of improving this process in the first place.

The present invention is based on an analysis of the reaction pattern in a silicon reduction furnace, whereby new means for influencing the furnace process have been found.

The reaction in a silicon reduction furnace is based on the following overall reaction formula:

$$SiO_2 + 2C \rightarrow Si + 2CO \qquad \text{I.}$$

However, the actual reduction takes place via a series of intermediates and at least SiO, SO, $CO_2$, C. $C_2$, $C_3$, $C_4$, $C_5$, O, $O_2$, Si, $Si_2$, $Si_3$, $SiO_2$, $Si_2C$, $C_2Si$, N, NO and $N_2$ are present in the gas phase of the reactor in non-negligible amounts. In condensed phase at least $Si_{(l)}$, $C_{(s)}$, $SiO_2(l)$, $SiO_{2(christobalite)}$, $SiO_{2(quartz)}$ and $SiC_{(s)}$ are present in non-negligible amounts. Silicon monoxide, SiO, and silicon carbide, SiC. are the most important of the intermediates, as these are produced as by-products in the furnace, SiO leaving in gas phase at the top of the furnace while SiC is accumulated in the furnace and removed at periodical shut downs of the furnace. The following reactions, among others, lead to formation of silicon monoxide in the reactor:

$$SiO_2 + C \rightarrow SiO + CO \qquad \text{II.}$$

$$2SiO_2 + SiC \rightarrow 3SiO + CO \qquad \text{III.}$$

Silicon carbide is formed inter alia via the following reactions:

$$Si + C \rightarrow SiC \qquad \text{IV.}$$

$$SiO + 2C \rightarrow SiC + CO \qquad \text{V.}$$

$$2SiO + C \rightarrow SiC + SiO_2 \qquad \text{VI.}$$

These intermediate products are necessary if the final product elementary silicon shall be obtained. Certainly silicon can be formed directly from carbon and quartz, but this requires very high temperatures and gives small yields. In conventional furnaces the silicon is formed essentially by the following reactions:

$$SiO_2 + SiC \rightarrow Si + SiO + CO \qquad \text{VII.}$$

$$SiC + SiO \rightarrow 2Si + CO \qquad \text{VIII.}$$

whereby part of the monoxide reacting according to reaction VIII can be formed according to reaction II if carbon is present. It is evident from the relationships of the reactions II, III, VII and VIII that silicon is formed by reaction between carbide, optionally also carbon, and silicon oxides, but that the proportions of the products silicon, silicon monoxide and carbon monoxide may vary due to the reciprocal predominance of the reactions. If carbon is not present in the reaction zone the overall reaction can be written:

$$SiO_2 + xSiC \rightarrow (2x-1)Si + (2-x) SiO + xCO \qquad \text{IX.}$$

where x may vary theoretically between 0.5 and 2. The carbide consumed in this reaction must be re-formed in the reactor. This takes place in the upper, cooler parts of the furnace essentially via the reactions V and VI above, as silicon and carbon, in a technical silicon furnace, will not get into contact with each other to such an extent that the reaction IV will appreciably contribute to the formation of carbide. This means that at least one mol silicon monoxide per mol silicon, corresponding to an x-value of maximum 1, must be formed in the reaction between quartz and silicon carbide and later be converted to carbide in order not to reduce the content of carbide in the furnace. Besides, it is in practice difficult to achieve x-values above 1 in a silicon furnace. If x is less than 1, which it thus generally is, the furnace can, in theory be operated in a couple of alternative ways. If all silicon monoxide that is formed is converted to carbide according to formula V, e.g. by charging a large amount of carbon per charged amount of quartz, a net production of carbide in the furnace is obtained corresponding to $(1-x)$. This is no satisfactory solution as it requires regular shut downs of the furnace and removal of the contents. If instead a smaller amount of carbon than the stoichiometrically required is charged, a net production of carbide can be suppressed as substantially not more than one mol monoxide is converted to carbide, but instead there will be a waste of unreacted silicon monoxide from the top of the furnace or a conversion of the monoxide in the furnace to silicon dioxide according to formula IV above will occur. These alternatives have also got their problems. Silicon monoxide leaving the furnace reacts to silica, and forms a finely divided powder causing environmental hazards in addition to loss of material if it is allowed to freely leave the furnace to the environment. The dust can be separated, but only with difficulty owing to its finely divided nature. Attempts have been made to recirculate such dust of the furnace, the loss of material thereby being eliminated. However, recycling will influence the furnace process unfavourably and, moreover, the energy economy of the process, which is the most burdensome part in view of costs, is not improved, since the energy required to reduce the quartz to monoxide is not recovered and this energy is almost as great as for the total reduction of quartz to elementary silicon. If the excess of silicon monoxide is directly retained in the furnace by reaction VI above, e.g. by cooling the furnace top, the loss of energy will be reduced, but the precipitation of silica in the charge will instead cause the well-known problems with tackiness of the charge, which results in a reduced reaction rate of the carbon, formation of blows and bridges in the charge, electrode breaks, a great need for working the charge and need for open furnaces. The outlined alternative ways of operating silicon furnaces are only theoretical as the silicon monoxide in real furnaces reacts according to all the reaction ways, i.e. carbide is built up, silicon monoxide vanishes to the environment and precipitation of quartz takes place int the charge. Instead of following the ideal reaction formula I above, the reaction will instead follow the more general formula:

$$SiO_2 + nC \rightarrow aSi + bSiO + cSiO + (n-c)CO \qquad X.$$

wherein a is always less than 1 and b and c are greater than 0. In order to avoid formation of carbide in the furnace as much as possible, a deficit of carbon relative to the amount of quartz is a rule charged, approximately corresponding to a value 1.8 for n.

All the problems mentioned above might be influenced in a favourable direction if the furnace process could be operated so that in the formation of silicon only one mol silicon monoxide was formed per mol of consumed silicon carbide and if this silicon monoxide could then be completely converted to silicon carbide. This can be said to correspond to an ideal furnace process.

The relation between formed products in the reaction IX for formation of silicon, is dependent on the temperature so that a larger amount of silicon and a smaller amount of silicon monoxide respectively, i.e. a higher value of x, can be obtained by increasing the reaction temperature. If carbon is present in the reaction zone, less than one mol carbon monoxide should be formed per mol of formed silicon, but also in this case the reaction is influenced in the desired direction by raising the temperature.

In order to achieve a complete conversion of the silicon monoxide, leaving the zone of silicon formation, to carbide according to reaction V it is required that alternative reaction ways of the silicon monoxide, primarily reaction VI, are suppressed. As reaction VI is strongly exothermic an increased temperature has a negative influence on this reaction and, raising the temperature might thus also here bring about a more complete formation of carbide. As the silicon monoxide reacts according to reaction V essentially in the upper and cooler parts of the furnace, the possibilities of influencing its conversion temperature will depend on the entire energy balance in the reactor, above all on the ratio of the energy content in the rising gases to the heat capacity of the charge material as well as on the reaction rate between gas phase and solid phase.

However, studies have shown that if the reaction temperature for the silicon conversion can be increased to such a value that essentially as much silicon monoxide is formed as later is consumed as carbide, the heat balance in the furnace will be such that formation of silica according to reaction VI will be substantially reduced in favour of formation of silicon carbide from the silicon monoxide. This applies also when a certain amount of carbon is present in the hotter part of the reactor so that also reaction II will take place.

Thus, it is important to be able to influence the reaction temperature in the furnace so that this can be raised relative to the temperature in today's furnaces. However, a substantial rise in temperature is difficult to attain in practice. The reactions VII and VIII for silicon formation are strongly endothermic and the reaction rates will therefore increase very much even at minor rises in temperature, whereby large amounts of energy are consumed and the temperature tends to drop to a lower value. As the reaction velocity increases without a substantial rise in temperature, only more products of essentially the same equilibrium composition will be produced, which in an ordinary furnace means an increased production of silicon monoxide leaving the furnace top.

This buffering effect on the temperature of the endothermic silicon formation reaction is so strong that an increased supply of energy in an ordinary furnace cannot be used to substantially increase the temperature. The same applies to the measures suggested in the previously mentioned Swedish patent specifications to modify the charges and and to separate carbon and quartz in the furnace. Compared with the increase in reaction velocity achieved also by small rises in temperature the mass transfer across the volume of the grains of raw material or between different parts of the furnace at the reaction zone will be of such minor importance that the effect on the furnace process will be small.

This invention is based on the above-mentioned results and considerations and involves a new way of operating thermal silicon reduction furnaces.

According to the invention the ratio of the amount of thermal energy to the amount of silicon oxide supplied to the furnace is made reciprocally adjustable and is set so that the gas leaving the furnace has a content of silicon monoxide below 10 mol percent.

By means of this production process the ideal furnace process is approached, as indicated above. The measures mean that the reaction temperature in the furnace is increased so that a less amount of silicon monoxide is formed per mol of formed silicon and that the monoxide is more efficiently converted to carbide in the furnace. In this way the amount of carbon per unit charged silicon raw material can be increased without the risk of carbide build-up, which means fewer necessary shut-downs and better utilization of raw materials.

The smoke losses will also be reduced, whereby the energy balance is considerably improved at the same time as the negative effects on the environment or the separation problemes decrease. The improved conversion of silicon monoxide to carbide means less precipitation of quartz in the furnace top, which reduces bridge formation in the charge, reduces the number of electrode breaks, reduces the need for working of the charge, and makes it possible to close the furnace, which is valuable for the recovery of the energy content in evaporated carbon monoxide gas, the reduction of effect on environment and the regulation of the air supply, and means in general a more continuous furnace process with improved control possibilities.

Additional advantages and effects of the invention will appear from the detailed description below and from the accompanying drawings.

In these

FIG. 3 shows a preferred form of bottom charging of only silicon raw material, while

By furnace is in this connection understood a reaction zone which comprises a hotter zone for energy supply and a cooler zone for subsequent reaction. At least the main part and preferably the whole part of the energy amount necessary for reduction of the silicon raw material with reducing agent to silicon as well as condensed phases from the zone of subsequent reaction are brought to the zone for energy supply. The silicon product and a gas phase are withdrawn from the zone of energy supply and the gas phase is fed to the zone of subsequent reaction. Reducing agent is supplied to the zone of subsequent reaction in addition to the gas phase from the zone of energy supply. From the subsequent reaction zone a gas phase product is withdrawn besides the condensed phases, which are fed to the zone of energy supply. The silicon raw material can in condensed form be supplied to any of the individual zones, but in gaseous form only to the zone of energy supply. In a reaction zone of this kind the formation of silicon will essentially take place in the zone of energy supply, while the formation of silicon carbide will essentially occur in the zone of subsequent reaction. In a common furnace the counterpart of the zone of energy supply is the area at the bottom of the furnace immediately around the electrode tips while the zone of subsequent reaction corresponds to the parts of the furnace which are higher up. No exactly defined or localized boundary between the zones exists, but what is essential is that there is a temperature gradient in the reaction zone.

In principle any silicon oxide containing substances can be used as silicon raw material. Pure silicon oxides are generally preferred, as these do not add any other elements that silicon and oxygen to the process. Solid silicas, especially quartz, are particularly suitable, as these can be obtained in a relatively pure form. Silicon monoxide can also be used in the reactor but is, in such a case, normally only an intermediate product in the process. Small amounts of naturally occuring silicates and aluminum oxides can e.g. be accepted with the silica without seriously impairing the purity of the final silicon product. Major amounts of cation containing silicates and oxides can be accepted only if the demands on purity are not high. In production of ferrosilicon iron or iron oxide in a desired molar ratio with respect to the final product is also added. Such an iron charge can be added together with the silicon raw material, by a separate charging or together with the reducing agent to the zone of subsequent reaction. The latter is preferred. Of course minor amounts of other raw materials can be added if other alloy elements in the final product are desired. The details in the process described below relate primarily to preparation of essentially pure silicon from silica, for which the process is especially suitable.

As reducing agent carbonaceous substances are preferred, e.g. organic materials such as wood chips or oprionally available slicon carbide but preferably highly concentrated carbon materials, such as coke, black coal or charcoal and preferably fairly pure such materials.

An important characteristic feature of the invention is that the energy supply per charged mol of silica is selected as control parameter and adjusted so that the gases at the top of the furnace will have a certain composition. Even if—as has been discussed above—the temperature in the reaction zone is an important process parameter it is difficult to control the furnace on the basis of this, both as it is difficult to measure and both as it varies through the furnace and also, to some extent locally in the reaction zone. Nor is the chemical composition of the reaction components in the reaction zone a suitable variable for controlling the furnace as this, even if it could be easily established, may vary widely and, moreover, may be far from theoretic chemical equilibrium composition in spite of the fact that the combined chemical and thermal equilibrium is very good. This is again related to the strongly endothermic silicon formation reaction, due to which also small variations in temperature can rapidly bring the composition of equilibrium far away from the existing composition despite the fact that the final composition may be very stable. A suitable control parameter has instead been found to be the energy supply to the furnace per charged amount of silicon raw material. This parameter is easy to establish, it is independent of local systematic and occasional variations as to energy and composition in the reactor, and a suitable value of this relation will provide a result which to a large extent is independent of charging method and possible excesses of carbon in the charge. As a measure of the furnace process according to the criteria given above the content of silicon monoxide in the gas at the furnace top is especially suitable, as this content at the furnace top is satisfactorily stabilized and fairly independent of charge height, carbon excess and minor variations in temperature at the top.

On account of equilibrium conditions for the gas phase composition relative to the solid phase in a reaction zone of the type indicated above, a certain amount of silicon monoxide will always be present in the gas phase when this leaves the reaction zone. Normally the content is generally definitely above 10 mol percent for ordinary silicon furnaces. According to the present invention a content of silicon monoxide below 10 mol percent is obtained by a more correct energy balance in the reactor. Such a value gives a clear improvement in relation to known furnaces in the respects discussed above. Preferably the content is maintained below 5 mol percent as at about this limit among other things the problems with precipitation of silica in the upper part of the furnace are avoided, which is a considerable advantage in relation to current furnaces, as has been discussed above.

With respect to yield the content is preferably maintained even below 1.5 mol percent. The smallest content possible to obtain at the best adjustment of the proportion of energy supply is essentially dependent on the temperature at the top of the furnace, which in its turn is dependent on the furnace height, the composition of the charge and optional cooling measures. Cooler flue gases give a lower content of silicon monoxide but also a risk of precipitation of silicon oxide in the charge. If precipitation of silica can be accepted, the content of silicon monoxide in escaping gases can thus be brought to a very low level by cooling measures, e.g. by indirect cooling or direct cooling with water or by supplying materials which can be subjected to pyrolysis, such as wood chips. However, by content of silicon monoxide in this connection is to be understood the content which is not influenced by possible additional methods of cooling or oxidation used to retain the silicon monoxide in the form of silica and silicon carbide at the top of the reactor. As silica is precipitated at temperatures below 1750°-1900° K. the content values thus refer to the composition of the gas which is in contact with reducing agent exceeding these temperature limits for the precipitation. Only such parts are considered to belong the reaction zone of the furnace. Under these conditions the lowest practical content will be fairly independent of furnace height and charge composition and is for practical reactors suitably above 0.05 mol percent and preferably above 0.1 mol percent. Too low values lead to a low top temperature and a too sensitive operation. The statements of contents relate to values at a steady state in the furnace, and if there are greater variations in the furnace process, the values refer to time averages.

Figure 1:
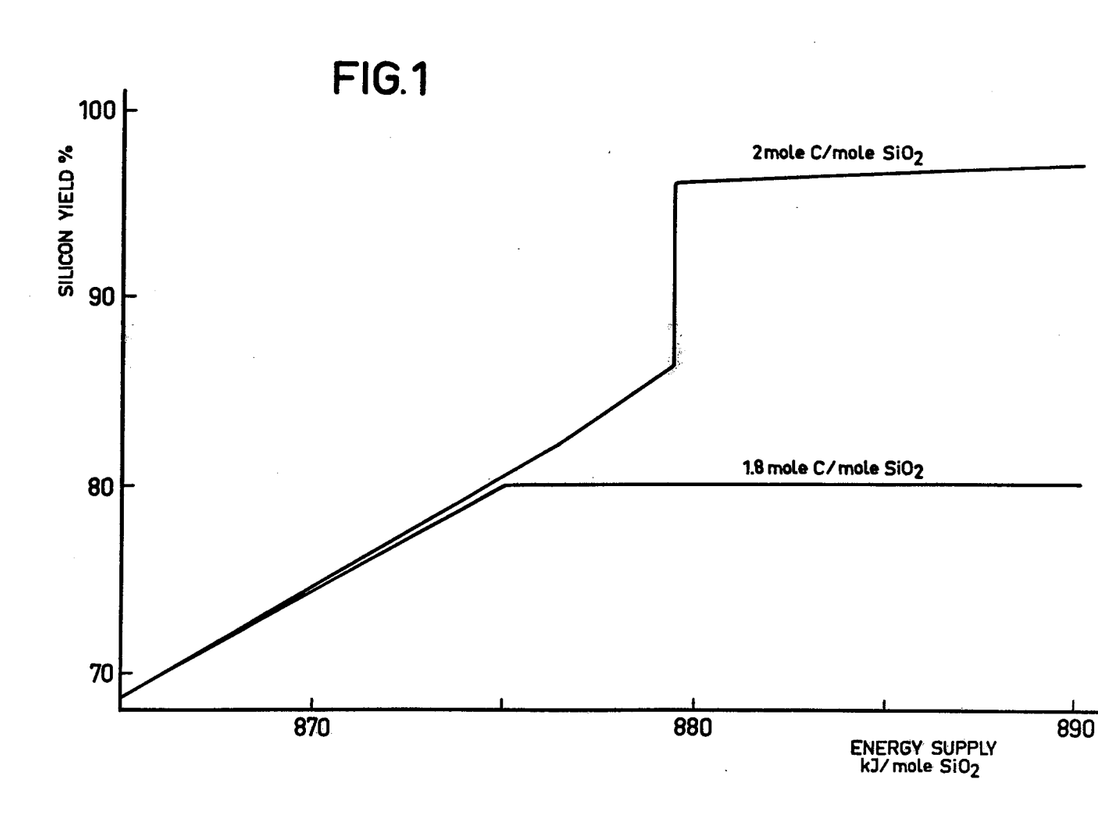
FIG. 1 shows a relationship between supply of energy and yield of silicon for a furnace of conventional construction, with charging of the components at the top, for two different charging ratios of carbon to silica in the charge.
Figure 2:
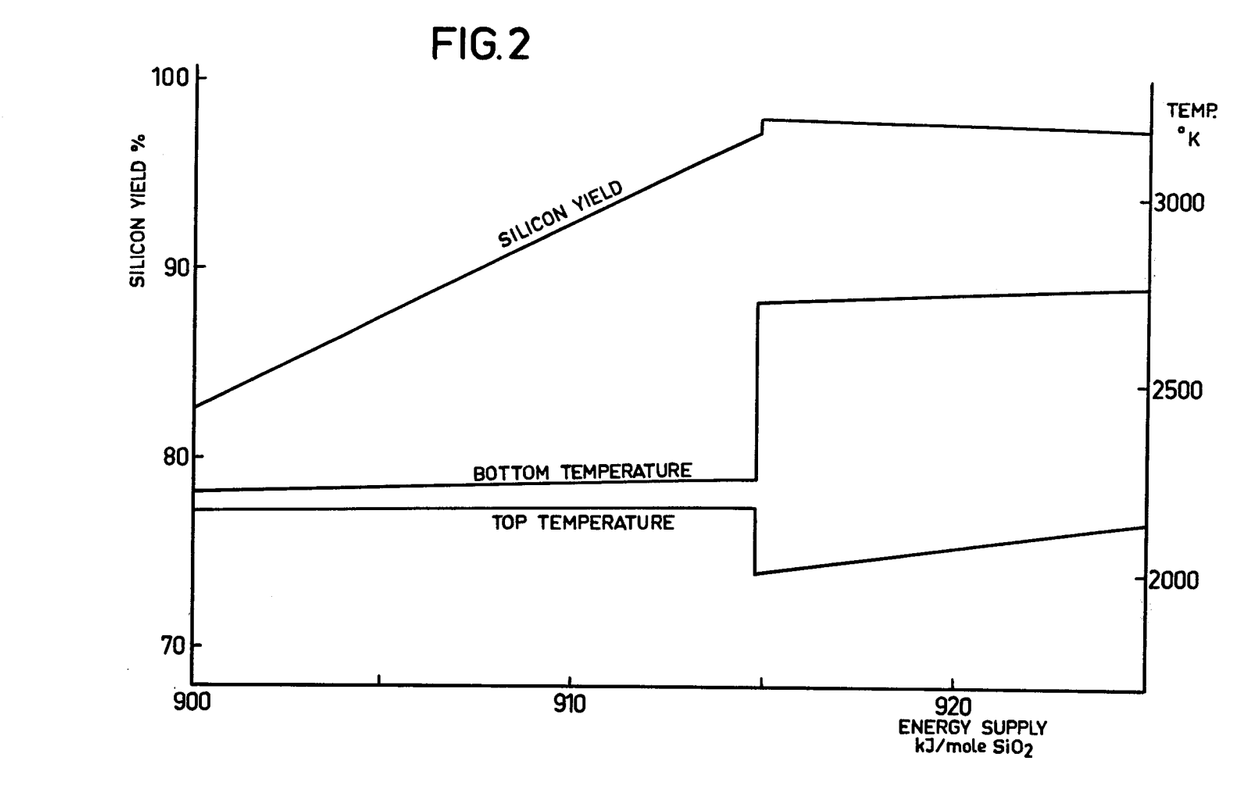
FIG. 2 shows a similar relationship for pure bottom charging of silica and the temperature conditions at different levels.

The amount of energy per mol of charged amount of silica to be supplied to the reaction zone is, except for the theoretically required amount for the reaction and for maintaining the energy balance in the reaction zone, also dependent on losses from the reaction zone to the surroundings and on possible moisture or other substances consuming energy in the raw materials. Such factors may vary strongly in various processes, and therefore general values of energy consumption cannot be given. The energy values will be somewhat different due to the manner of charging the silicon raw material. When the whole amount is charged to the zone of subsequent reaction a relation between supply of energy and yield according to FIG. 1 is obtained. It is evident from the figure that the energy should exceed 875 kJ per mol silica and preferably also exceed 878 kJ. At about 880 kJ carbon is present deep down in the furnace and a strong rise in temperature is necessary to repress the production of silicon monoxide. To avoid damage of the furnace and the equipment or tapping due to the rise in temperature the supply of energy should be kept below this value. Normally the furnaces of today do not use more than 870 kJ. If all silicon raw material is supplied to the zone of energy supply the required energy supply will be somewhat higher, mainly due to a higher temperature of gases leaving the reaction zone. The energy supply is evident from FIG. 2. It should preferably exceed 900 and most preferably exceed 910 kJ per mol silica. As a strong rise in temperature is obtained also here at an energy supply exceeding about 915 kJ and, moreover, the yield of silicon is best here, this energy value should not be exceeded but the supply of energy should rather be immediately below this value. If half the amount of carbon is charged together with the silica in the zone of energy supply the partial pressure of silicon monoxide will be lower and the necessary will increase to a minimum of 920 kJ, preferably minimum 940 kJ and suitably maximum 980, preferably maximum 960 kJ per mol silica. When the silicon raw material is charged partly to the zone of subsequent reaction and partly to the zone of energy supply, the required energy will be between the values recommend above. Even if the indicated energy values are only theoretic, as stated above, by corresponding to an operation of the furnace without losses, the behaviour of the furnace will correspond in principle to that described at changes in the relation of energy supply, and the theoretic energy consumption can be determined from the behaviour of the furnace. At changes in the energy supply a considerably dead time until the whole furnace has reached a new state of equilibrium must be taken into consideration.

The ratio of charged amount of carbon to charged amount of silica expressed in moles is important to obtain a low content of leaving silicon monoxide. As mentioned above this value does normally not exceed 1.8, but can be about 2 according to the invention. Preferably it is between 1.95 and 2 at top feeding. At bottom feeding the consumption of reducing agent is not directly controllable but a consequence of the furnace operation. When calculatint the charging of carbon, the amount of carbon should be included which is added by consumption of the carbon electrodes, normally about 10 percent of the whole amount of carbon.

The amount of charge material in the reaction zone should be large enough in order that an additional increase of the charge height would not appreciably influence the composition of the top gases. A suitable height according to the invention is about the same as for previous furnaces.

The pressure in the reaction zone can be above atmospheric, which increases the reaction rates and makes the process more efficient, but the practical difficulties are of such a kind that the reaction is preferably carried out at atmospheric pressure.

Inert gas can be supplied to the reaction zone, primarily the zone of energy supply, e.g. for the charging or for an improved control of the process. Inert gas will, however, reduce the efficiency and energy economy of the process as the energy values mentioned above increase and large amounts should therefore not be supplied. Optional inert gas suitably consists of carbon monoxide, preferably taken from the process itself.

The invention can be practiced in such a manner that carbonaceous material and silicon oxide are brought to the reaction zone in such a near enough stoichiometric ratio as permitted by the carbide formation in the reaction zone, and energy is supplied, the ratio of supplied energy to supplied silicon oxide having been made at least so controllable, e.g. in the way discussed below, that a leaving gas having a content of silicon monoxide indicated above can be obtained when the ratio is raised until the lowermost value of the content of leaving silicon monoxide is obtained. The ratio of supplied energy to silicon oxide is preferably made sufficiently controllable to permit an increase of the ratio until a rise in temperature, according to the above occurs, whereby the ratio in operation is set below this value. Regulation of the ratio can be carried out either by varying the supply of energy or the supply of silicon oxide while the other variable is kept constant, or by variation of both the variables.

According to what has been said above an improved adjusting possibility of the supply of energy to the supply of silica, compared with furnaces of today, in which the carbon and quartz materials quite simply fall down into the hotter parts as the material there is consumed, is required to obtain a satisfactory supply of energy. By charging to such a conventional furnace a quartz material which melts more slowly and is disintegrated the energy supply can be favourably influenced. As mentioned above it is, however, difficult to achieve substantial improvements in this way. Another way of utilizing conventional furnaces for the purpose of the invention is to charge silicon raw material which reacts more slowly, e.g. by supplying Al, Ca or Fe to the charge, this will, however, contaminate the final product. It is thus difficult to influence the energy regulation favourably in a conventional furnace.

Therefore it is preferred that the flow of at least some part of the silica to the zone of energy supply is made independent of the energy supply to the zone and is charged to the zone in a controlled manner. One way of making this with maintained charging at the top of the whole raw material flow is to separate the reaction zone between the zone of energy supply and the zone of subsequent reaction and to make the connection such that the flow of condensed phases from the zone of subsequent reaction to the zone of energy supply can be adjusted, preferably by means of a mechanically controllable connection. In practice this can be carried out by inserting a partition between the hotter bottom parts and the cooler top parts of the furnace, which partition is designed in such a manner that the flow through it of at least the condensed phases, but preferably also the gas flow, can be controlled from the outside of the furnace, e.g. as a bottom with an adjustable opening to the bottom of the furnace. The same purpose can be achieved by designing the furnace as at least two separate parts, the condensed phases being brought to the zone of energy supply using a mechanical transport device, preferably a lock between two furnaces positioned over each other. The gas can then be transported through another or preferably the same connection.

However, it is preferred that at least part of the silicon raw material to be supplied to the furnace is not charged to the zone of subsequent reaction, but to the zone of energy supply, possibly via a transport route through the zone of subsequent reaction for heat exchange without contact with the material there. A direct charging to the zone of energy supply means improved control possibilities in a relatively simple way. It is not necessary to intervene in the transport of solid material in the hot parts of the furnace and, moreover, the silicon raw material can, in addition to being supplied independently of the energy, also be supplied independently of the charging of reducing agent. By bottom charging the amount of material in the zone of subsequent is also reduced and thereby heat capacity. As a result of this the temperature will be higher and the risk of precipitation of silica will be smaller, even if the content of silicon monoxide in the gas phase increases. The bottom charging degree can thus be used as a means of balancing these factors reciprocally and can e.g. be chosen so that the smallest possible content of silicon monoxide is obtained without the risk of precipitations. However, practical and regulation factors must also be considered.

In order to achieve an effective control at least 33 percent of the silicon raw material should be charged directly to the zone of energy supply, but preferably at least 70 percent and most preferably the whole amount of silicon raw material is charged in this manner. Part of the reducing agent can also be charged to the zone of energy supply but then this amount should not exceed what is stoichiometrically required for conversion of silica to silicon monoxide, i.e. about half the amount of reducing agent, while the rest is supplied to the zone of subsequent reaction. When charging part of the reducing agent to the zone of energy supply care should be taken that the reducing agent is not introduced in such a way that it will come directly into contact with liquid elementary silicon, as it will then form carbide with this according to reaction IV, which reduces the efficiency of the process. Material charged in the usual way in the zone of subsequent reaction consists of normal charging material.

In order to obtain the desired improvement of the control possibilities it must be possible to control the supply of the silicon raw material to the zone of energy supply uniformly and essentially continuously. An intermittent supply or supply of large batches or pieces of material will easily result in a violent formation of silicon monoxide, which prevents the maintenance of the correct temperature for formation of the correct proportions between this gas and elementary silicon, as discussed above. It may also lead to a great increase of the temperature which can damage parts of the furnace. When the particles are larger, e.g. between 1 and 100 mm or especially between 10 and 50 mm, the material is therefore supplied preferably by means of some mechanical lock, particularly screws, to obtain a uniform supply. A more uniform supply is obtained if the part supplied to the zone of energy supply is in the form of a gas, a liquid or a powder. For practical reasons a pulverulent raw material is preferred. In order to obtain a uniform supply of this powder it is preferred that it is blown by means of a gas stream, and it is thus required, that the powder is sufficiently finely divided to be carried by the gas flow. With respect to these factors and to the melting velocity, and consequently the risk of tackiness according to what is said below, the particle size should be between 0.05 mm and 10 mm and preferably between 0.1 and 1 mm. A suitable auxiliary gas is carbon monoxide, which already is present in the reaction zone and which gas advantageously can be separated from gases leaving the reaction zone. As large amounts of inert gas should not be supplied to the furnace, more than 0.1 $Nm^3$ gas should not be supplied per kg charged powder and preferably not more than 0.02 $Nm^3$. To avoid deposits the amount should exceed 0.001 $Nm^3$ and preferably exceed 0.005 $Nm^3$. For supply according to this pattern a transport channel ending in the zone of energy supply is required.

There is then a risk that the silicon raw material will be deposited in the channel due to partial melting and caking, and therefore it is suitable that measures are taken to keep the channel free from such deposits. This can be made by heating the whole channel to a temperature above the melting point of the silicon raw material, either by direct heating of the channel or by heating the gases in the channel. Heating the gases is preferred because it is simple. Even if it is possible to heat the whole auxiliary gas stream continuously by the aid of conventional heating means to a suitable temperature for keeping the supply channel clean, which heating, in that case, preferably is carried out before addition of the particulate material, it is preferred that charging is carried out by means of a non-heated auxiliary gas stream while cleaning is carried our periodically, preferably with the aid of a separate gas stream, said gas stream being heated to a high temperature, preferably by means of a plasma burner. The advantage of a periodic cleaning, when necessary, and a high temperature of the gas stream is that a smaller total amount of inert gas stream need be supplied to the reaction zone, which reduces the influence on the process. The hot gas stream can either be led the same way through the supply channel as the charging stream or be especially directed towards the parts where deposits tend to be built-up. Such a directed stream can be achieved in the easiest way if the supply channel is arranged in the form of a hole through the furnace wall, which preferably ends in the furnace on a level with the electrode tips, whereby another hole can be arranged for the gas stream led through the plasma burner and directed so that it ends at areas with a great risk of deposits. Holes through the furnace wall for the supply are preferred as they withstand the furnace environment better and offer less risk areas for deposits than other alternatives, mainly such where supply takes place through a channel through the charge. If such a supply through the charge is still desired, e.g. in view of preheating, charging through the electrodes is preferred to other alternatives, such as lances or separating walls in the furnace. Of course plasma burners can be used with advantage when the auxiliary gas is itself heated instead of a special gas stream. When calculating the necessary energy amount to be supplied to the zone of energy supply, energy supplied via the plasma burner or otherwise with the flows of raw materials should of course be considered.

As mentioned above reducing agent can be supplied together with the silicon raw material at the direct supply thereof to the zone of energy supply but need not be supplied in this way. If substantially only the silicon raw material is supplied directly to the zone of energy supply, the energy for the reaction is preferably supplied at a place where the charged silicon raw material meets the condensed phases, but preferably not the liquid silicon phase in the zone of energy supply, as the endothermic reaction of silicon formation takes place first at this contact, and a supply of energy before this point would only lead to an increase of the temperature of the flow of silicon raw material in an unfavourable way. However, in the contact zone between the flows the whole energy for the preparation of silicon can be supplied with advantage, preferably by heating with an electric arc, possibly with a minor part of the energy in another way. Thus, if the flow of silicon material does not contain reducing agent, it is preferably injected directly into the hot part of the charge in the zone of energy supply, which in a conventional furnace corresponds to a supply channel drilled in the lower part of the furnace wall and ending directly in the charge inside this.

Figure 3:
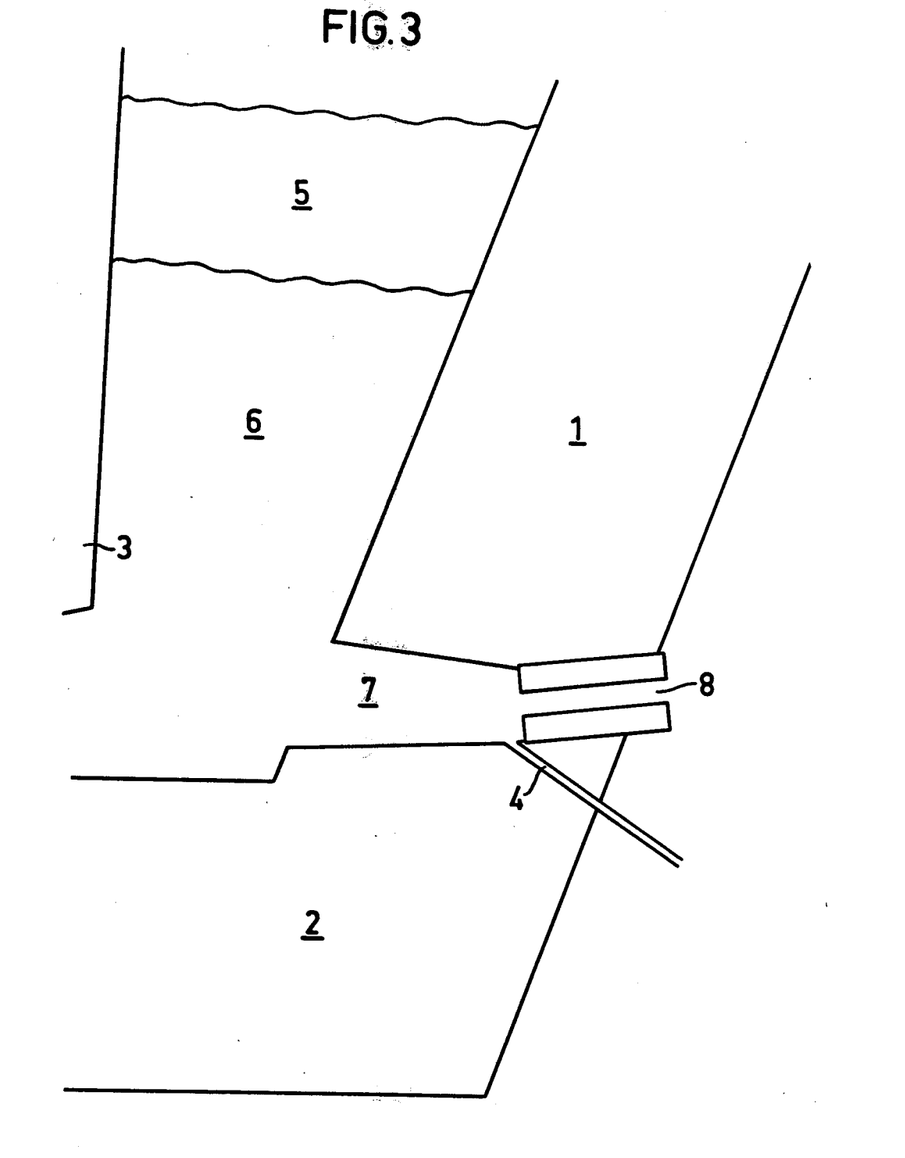

In FIG. 3 a furnace for silicon preparation of this type is shown, where silica is introduced in the furnace bottom. In the figure position 1 designates the furnace wall, 2 is the furnace bottom and 3 an electric arc electrode. Carbon is charged at the furnace top whereas the silica is blown in by means of an inert gas stream through a bore 4 in the furnace bottom. In operation of the furnace an upper zone 5, substantially containing carbon, and a lower zone 6, substantially containing silicon carbide, are formed. As the energy supply via the electrode 3 and the supply of silica through the bore 4 can be made completely independently of each other the furnace can be operated to the desired balance according to the invention. If the inlet for the bottom charging 7 is clogged, cleaning can be carried out with the aid of the plasma burner 8, which is inserted in another bore in the furnace wall 1 and through which inert gas can be conveyed.

If reducing agent is charged together with the silicon raw material to the zone of energy supply, the flow can be supplied as above, but there are also other possibilities. In a flow containing both the silicon raw material and reducing agent, the components can react with each other if the temperature is high enough, which means that if energy is supplied to this flow before it gets into contact with the condensed phases in the zone of energy supply, this will not only lead to an unfavourable rise in temperature, but at a temperature exceeding about 1500° K. the charged materials form silicon monoxide and carbon monoxide. This product gas containing silicon monoxide can then be conveyed to contact with the other part of the zone of energy supply containing condensed phases, where the reaction of silicon formation takes place at a temperature exceeding about 1900° K., and then the reactions of silicon carbide formation in the zone of subsequent reaction, according to the same pattern as previously described. It is thus a preferred embodiment of the invention that the zone of energy supply is divided into a first zone, essentially free from silicon and silicon carbide, and a second zone essentially containing silicon and silicon carbide, whereby silicon raw material together with reducing agent is charged to the first-mentioned zone and there is supplied with energy, after which the product gas is conveyed into contact with the second zone. It is preferred that the whole amount of silicon raw material is charged in this way and, moreover, that the amount of reducing agent charged at the same time is about stoichiometric for conversion of the silicon raw material to silicon monoxide.

All the energy required for the silicon preparation can be supplied to the first zone while no energy is supplied to the second zone, but it is preferred that only the amount of energy required for conversion of the charge materials to silicon monoxide is supplied to the first zone of the zone of energy supply, while the rest is supplied to the second zone. This is to avoid too high temperatures of the gases conveyed from the first to the second zone. As the energy consumption for formation of silicon monoxide, as mentioned above, is the major part of the total energy consumption, about 822 kJ per mol silica, at least 80% of the total energy should be supplied in the first zone and preferably between 85 and 95%.

This energy is suitably supplied by means of an electric arc in an ordinary way, while the rest of the energy, about 126 kJ per mol silica, is supplied to the second zone of the zone of energy supply, using simpler heating methods, preferably resistance heating. As the silicon raw material reacts in one place and the silicon formation takes place in another place in the zone of energy supply, impurities and slag from the silicon raw material will not contaminate the silicon product and this will be much more pure. Furthermore, the possibilities of controlling the process will be very good due to the separated reactions. Charging is also simplified by the fact that no solid charge is in the way at the supply channel and the absence of a charge also makes it possible to allow the material to simply fall down into the first zone.

Figure 4:
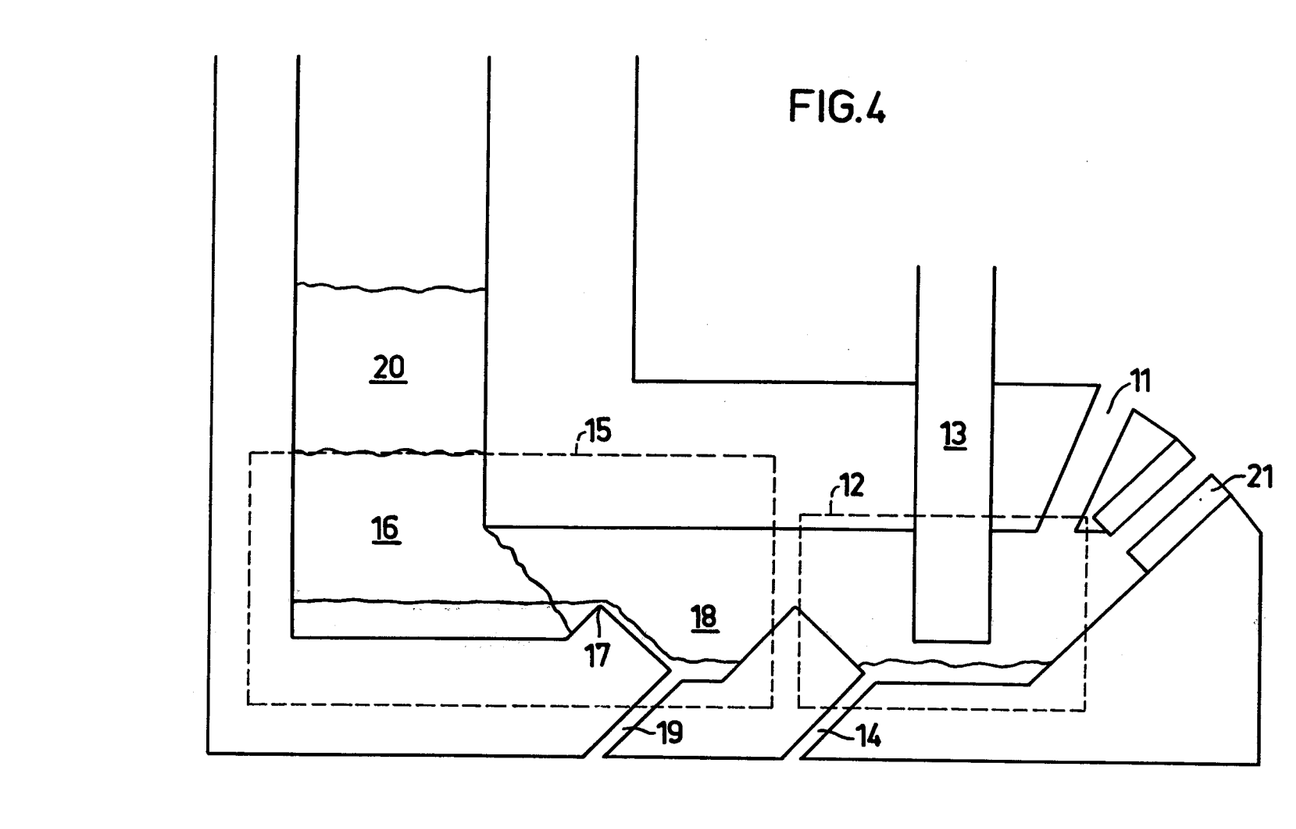
FIG. 4 shows a preferred form of bottom charging of both silicon raw material and reducing agent.

FIG. 4 shows a furnace construction of this type which is preferred when both the silicon raw material and the reducing agent are charged in the bottom. Through the shoot 11 the raw materials can be introduced in the first part of the zone of energy supply in the reactor, which has been framed with broken lines in the figure and makred with 12. At the bottom of this part a conversion of the supplied materials to carbon monoxide and silicon monoxide takes place by means of heat, supplied by an electric arc formed between the electrode 13 and the furnace bottom. Remaining slag is removed through the channel 14. The gases are led to the other part 15 of the zone of energy supply, where they get into contact with the solid phase 16 and react with silicon carbide to elementary silicon overflowing the edge 17, being collected in the trough 18 and taken out through the channel 19. Optionally additioneal energy is supplied to the solid phase 16 by resistance heating. Gases which have not been converted and which leave the solid phase part 16 of the zone of energy supply will enter the essentially carbon containing zone 20 of subsequent reaction, where the remaining amount of silicon monoxide reacts to form silicon carbide which moves downwards towards zone 16. Carbon is charged to zone 20 in accordance with the consumption thereof. Periodic cleaning of the inlet pipe 11 by blowing can also in this case be carried out by means of a plasma burner 21 inserted in another bore than the downcomer 11 in the furnace wall.

I claim:

1. A process for the preparation of silicon or ferrosilicon by reduction of silicon oxide in the form of silicas or cation containing silicates and oxides, optionally in the presence of iron or iron oxide, by means of a carbonaceous reducing agent in a reaction zone, which reaction zone comprises a zone of energy supply and a zone of subsequent reaction, whereby at least energy and condensed phases from the zone of subsequent reaction are brought to the zone of energy supply while silicon product and a gas phase are leaving the zone of energy supply and whereby at least carbonaceous reducing agent and the gas phase from the zone of energy supply are brought to the zone of subsequent reaction while a gas phase product and condensed phase are leaving the zone of subsequent reaction so that the gas phase product leaves the reaction zone and the condensed phases enter the zone of energy supply and whereby the silicon oxide is supplied in condensed form somewhere in the reaction zone or in gas phase to the zone of energy supply, comprising the steps of:

(a) supplying at least 33 percent of the silicon oxide directly into the zone of energy supply through a channel through the furnace wall, or a channel through the charge or a channel through the electrodes, (b) controlling the supply rate of the silicon oxide to the zone of energy supply essentially continuously and in an adjustable way to make the consumption of the silicon oxide in the zone of energy supply independent of the charging of energy to the zone of energy supply so that the temperature in the zone of energy supply can be influenced, and (c) regulating the supply rate of silicon oxide and the supply rate of energy to the zone of energy supply to give a high enough temperature in the zone of energy supply to give a content of silicon monoxide below 5 mole percent in the gas leaving the zone of subsequent reaction.

2. A process as claimed in claim 1 which includes the step of blowing the silicon oxide into the zone of energy supply in the form of a powder distributed in a stream of auxiliary gas.

3. A process as claimed in claim 2 which includes the step of feeding the powder/gas mixture, the stream of auxiliary gas or an additional gas stream to the zone of energy supply through a plasma burner before entering said zone, whereby sufficient energy is supplied to avoid deposits in the supply equipment.

4. A process as claimed in claim 1 which includes the step of melting the silicon oxide before supplying it to the zone of energy supply.

5. A process as claimed in claim 1 which includes the step of feeding also a part of the reducing agent directly to the zone of energy supply.

6. A process as claimed in claim 5 which includes the step of adapting the amount of reducing agent brought directly to the zone of energy supply approximately to that required stoichiometrically for reduction of the silicon oxide to silicon monoxide.

7. A process as claimed in claim 6 which includes the steps of providing in the zone of energy supply a portion substantially free from carbide and silicon, introducing the amounts of silica and reducing agent brought directly to the zone of energy supply into this portion, reacting them with each other to form silicon monoxide and moving the silicon monoxide into contact with the other parts of the zone of energy supply.

8. A process as claimed in any of claims 1 to 7 which includes the step of setting said ratio so that the gas phase product leaving the zone of subsequent reaction has a content of silicon monoxide below 1.5 mole %.

* * * * *